(12) United States Patent
Sakaray et al.

(10) Patent No.: US 10,411,556 B1
(45) Date of Patent: Sep. 10, 2019

(54) ENCLOSURE WITH INLET AND OUTLET BAFFLES FOR GENERATOR SET

(71) Applicant: Caterpillar Inc., Peoria, IL (US)

(72) Inventors: Umakanth Sakaray, Dunlap, IL (US); Jim K. Carroll, Peoria, IL (US); Sudhakar R Kakani, Lafayette, IN (US); Rakesh C. Ramachandran, Peoria, IL (US); Steven J. Eveker, Peoria, IL (US); Dhanasekar Murugan, Peoria, IL (US); Sathishkumar Bakthavachalu, Chennai (IN); Ram Kumar Ramasamy, Bangalore (IN)

(73) Assignee: Caterpillar Inc., Deerfield, IL (US)

( * ) Notice: Subject to any disclaimer, the term of this patent is extended or adjusted under 35 U.S.C. 154(b) by 0 days.

(21) Appl. No.: 15/915,204

(22) Filed: Mar. 8, 2018

(51) Int. Cl.
| | | |
|---|---|---|
| *H02K 5/24* | (2006.01) | |
| *H02K 5/20* | (2006.01) | |
| *H02K 7/18* | (2006.01) | |
| *H02K 9/06* | (2006.01) | |
| *F04D 29/66* | (2006.01) | |
| *F04D 25/12* | (2006.01) | |

(52) U.S. Cl.
CPC .................. *H02K 5/24* (2013.01); *H02K 5/20* (2013.01); *H02K 7/1815* (2013.01); *H02K 7/1823* (2013.01); *H02K 9/06* (2013.01); *F04D 25/12* (2013.01); *F04D 29/664* (2013.01)

(58) Field of Classification Search
CPC .......... H02K 5/20; H02K 5/24; H02K 7/1815; H02K 7/1823; H02K 9/06; F04D 25/12; F04D 29/664
See application file for complete search history.

(56) References Cited

U.S. PATENT DOCUMENTS

| | | | |
|---|---|---|---|
| 4,316,522 A | * | 2/1982 | Hirschorn ............. F04D 29/664 |
| | | | 181/224 |
| 4,385,678 A | | 5/1983 | Cederbaum |
| 5,250,764 A | * | 10/1993 | Doychak ................. F02K 1/827 |
| | | | 181/224 |

(Continued)

FOREIGN PATENT DOCUMENTS

| | | | |
|---|---|---|---|
| JP | 2012251527 A | * | 12/2012 |
| JP | 5460645 | | 4/2014 |

(Continued)

*Primary Examiner* — Tulsidas C Patel
*Assistant Examiner* — S. Mikailoff
(74) *Attorney, Agent, or Firm* — Oblon, McClelland, Maier & Neustadt

(57) ABSTRACT

An enclosure for a generator includes an air inlet formed at a first end of the enclosure, and an air inlet opening formed in a sidewall of the enclosure. The air inlet includes an air inlet duct formed in an interior space of the enclosure, and in fluid communication with the air inlet opening. The air inlet duct receives the airflow from the air inlet opening to direct the airflow towards an air outlet of the enclosure. The air outlet includes an air outlet duct formed at a second end of the enclosure which receives the airflow from the air inlet opening. The air outlet duct directs the airflow towards an air outlet opening formed in a top plate of the enclosure which provides an exit for the airflow to escape from the interior space to an ambient environment of the enclosure.

17 Claims, 7 Drawing Sheets

(56) References Cited

U.S. PATENT DOCUMENTS

| | | | | |
|---|---|---|---|---|
| 6,491,133 B2* | 12/2002 | Yamada | ............... | E02F 9/0866 |
| | | | | 123/195 C |
| 7,081,682 B2* | 7/2006 | Campion | ............... | F02B 63/04 |
| | | | | 123/2 |
| 7,642,665 B2* | 1/2010 | Konop | ............... | H02K 7/1815 |
| | | | | 123/2 |
| 7,795,745 B2* | 9/2010 | Mellon | ............... | F02B 63/04 |
| | | | | 123/2 |
| 8,151,566 B2* | 4/2012 | Leistner | ............... | B64F 1/34 |
| | | | | 60/599 |
| 8,240,429 B1* | 8/2012 | Singhal | ............... | H02K 5/20 |
| | | | | 181/212 |
| 8,881,694 B2* | 11/2014 | Gillett | ............... | F02B 63/044 |
| | | | | 123/41.1 |
| 9,252,640 B2* | 2/2016 | Gillett | ............... | F02B 63/044 |
| 2002/0000342 A1* | 1/2002 | Yamada | ............... | E02F 9/0866 |
| | | | | 181/204 |
| 2003/0030279 A1* | 2/2003 | Campion | ............... | F02B 63/04 |
| | | | | 290/1 A |
| 2008/0042625 A1* | 2/2008 | Konop | ............... | H02K 7/1815 |
| | | | | 322/1 |
| 2015/0061296 A1* | 3/2015 | Gillett | ............... | H02K 5/20 |
| | | | | 290/1 A |

FOREIGN PATENT DOCUMENTS

| | | | |
|---|---|---|---|
| JP | 2014126033 | | 7/2014 |
| JP | 2014126033 A | * | 7/2014 |
| JP | 6055303 | | 12/2016 |
| JP | 2017122395 | | 7/2017 |

\* cited by examiner

US 10,411,556 B1

ENCLOSURE WITH INLET AND OUTLET BAFFLES FOR GENERATOR SET

TECHNICAL FIELD

The present disclosure relates to an enclosure for an electrical generator set. More particularly, the present disclosure relates to an enclosure that directs airflow in a manner that attenuates noise.

BACKGROUND

Electrical generator sets, or gensets, typically include an electrical generator coupled to a prime mover, such as an internal combustion or gas turbine engine, packaged within an enclosure. Operation of the engine and other components, such as cooling fans, etc. produce noise which in some instances may be higher than 90 dBa. Packaging the genset within an enclosure helps to attenuate noise.

However, enclosures need to allow sufficient airflow to cool the genset components. The airflow through the enclosure may carry heat from an interior of the enclosure to an immediate external vicinity of the enclosure, thereby raising a temperature of the immediate ambient environment. Both, a noisy ambient and a high temperature ambient, are undesirable effects of a genset operation.

U.S. Pat. No. 7,081,682 discloses an air duct employed in a portable power module. The air duct is mounted within the portable power module, and is configured to introduce ambient air into a motor compartment of the portable power module. The air duct includes a body positioned over an inlet, of the portable power module, to define openings for the ambient air to enter the motor compartment.

SUMMARY

In an aspect of the disclosure, an enclosure defining an interior space for a generator set including an engine coupled to an electrical generator is disclosed. The enclosure includes an air inlet including an air inlet opening formed in a sidewall of the enclosure and disposed proximal to a first end of the enclosure. The air inlet opening is parallel to a longitudinal axis of the enclosure. The air inlet further includes an air inlet duct in fluid communication with the air inlet opening. The air inlet duct includes an inlet end wall disposed at the first end and positioned parallel to a lateral axis of the enclosure. The lateral axis is perpendicular to the longitudinal axis. The air inlet duct further includes an inlet duct wall extending from the inlet end wall, and is aligned along the longitudinal axis. The enclosure further includes an air outlet disposed at a second end of the enclosure and in fluid communication with the air inlet. The air outlet includes an air outlet duct including an outlet end wall disposed at the second end and parallel to the lateral axis. The air outlet duct further includes an air outlet opening formed in a top wall of the enclosure. The air outlet opening is disposed proximal to the second end of the enclosure. The air outlet opening is parallel to a plane defined by the longitudinal axis and the lateral axis. The air outlet further includes one or more outlet baffle plates extending from the outlet end wall into the interior space. The one or more outlet baffle plates are parallel to the longitudinal axis and extend from a top end of the outlet end wall.

In another aspect of the disclosure, a generator set including an enclosure is disclosed. The enclosure defines an interior space for the generator set including an engine coupled to an electrical generator is disclosed. The enclosure defines a longitudinal axis and a lateral axis, wherein the lateral axis is being perpendicular to the longitudinal axis. The enclosure has a first end and a second end. The enclosure includes an air inlet including an air inlet opening formed in a sidewall of the enclosure and disposed proximal to the first end. The air inlet opening is parallel to the longitudinal axis. The air inlet further includes an air inlet duct in fluid communication with the air inlet opening. The air inlet duct including an inlet end wall disposed at the first end and positioned parallel to the lateral axis. The air inlet duct further includes an inlet duct wall extending from the inlet end wall, and is aligned along the longitudinal axis. The enclosure further includes an air outlet disposed at the second end and in fluid communication with the air inlet. The air outlet includes an air outlet duct including an outlet end wall disposed at the second end and parallel to the lateral axis. The air outlet duct further includes an air outlet opening formed in a top wall of the enclosure. The air outlet opening is disposed proximal to the second end of the enclosure. The air outlet opening is parallel to a plane defined by the longitudinal axis and the lateral axis. The air outlet further includes one or more outlet baffle plates extending from the outlet end wall into the interior space. The one or more outlet baffle plates are parallel to the longitudinal axis and extends from a top end of the outlet end wall.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts.

Figure 1:
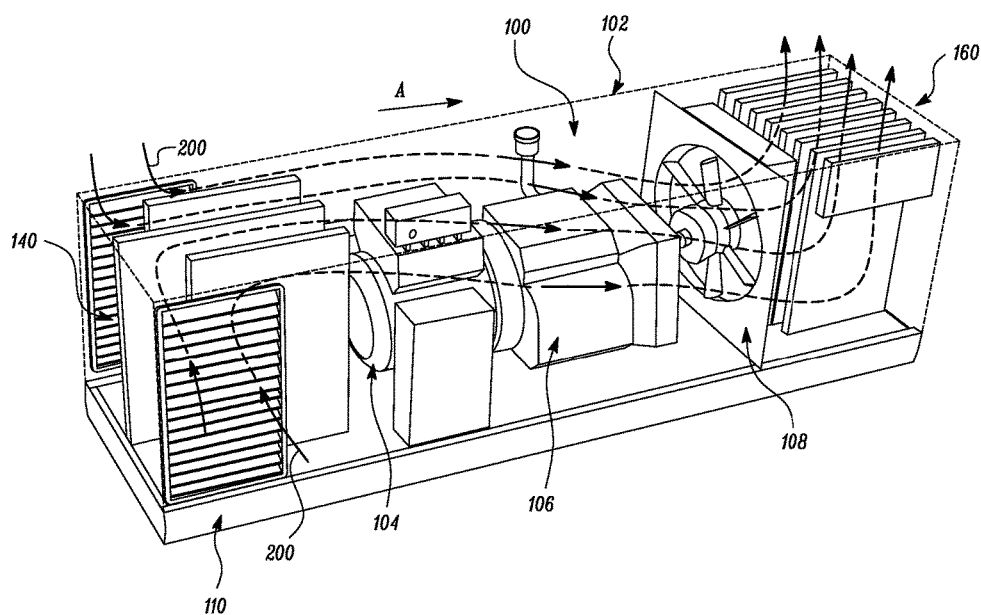
FIG. 1 is a generator set with a part of an enclosure of the generator set removed, showing airflow and internal components, in accordance with an embodiment of the present disclosure.

Referring to FIG. 1 a generator set 100 is shown. The generator set 100 includes an enclosure 102 (shown in dotted line), an engine 106, and a generator 104. The engine 106 powers an operation of the generator set 100, and may be a reciprocating engine, gas turbine, or other engine type. The engine 106 may be configured to run on one or more fuels, such as, diesel, natural gas, bio-diesel, propane, etc.

The generator 104 may be an electrical generator coupled to the engine 106, configured to convert mechanical energy produced by the engine 106 into the electrical energy. In one example, the generator 104 may be coupled to an output shaft (or a flywheel, not shown) extending from the engine 106, such that a rotation of the output shaft may provide motive power for an operation of the generator 104.

The generator set 100 may further include a blower 108, which may be powered by the same output shaft (not shown) of the engine 106 that also powers an operation of the generator 104. The blower 108 may be configured to provide a flow of air over and across the arrangement of the generator 104 and the engine 106. In one example, the blower 108 may be positioned forward of the engine 106 (downstream relative to a direction of flow of air represented by arrow, A), and may generate suction to draw air from over and across the generator 104, and then across the engine 106.

The generator-engine-blower arrangement discussed above may be varied in certain applications. For example, the blower 108 may be positioned closer to the generator 104 than to the engine 106, so that the generator set 100 may define a blower-generator-engine arrangement instead. Alternatively, the blower 108 may be positioned aft of the generator 104 (i.e. the blower 108 may be positioned upstream relative to the direction of flow of air represented by arrow, A, FIG. 1). Other configurations may be contemplated, and it may be understood that the arrangement of the engine 106, generator 104, and the blower 108, as disclosed, is purely exemplary.

Figure 2:
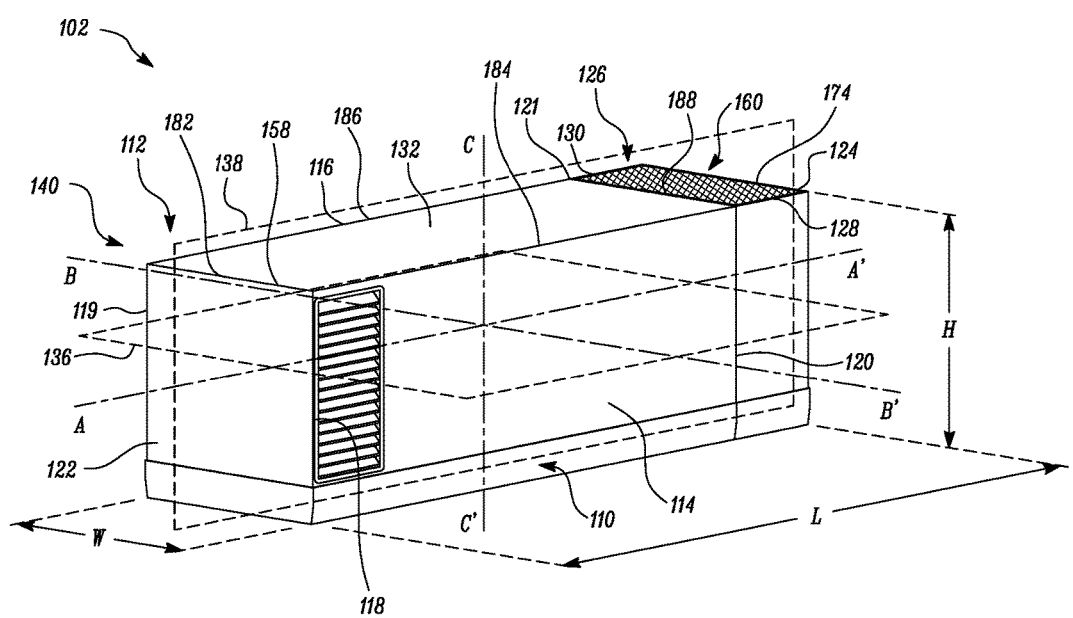
FIG. 2 is an external perspective view of the enclosure of the generator set, in accordance with an embodiment of the present disclosure.

Referring to FIGS. 1 and 2, the enclosure 102 housing the generator-engine-blower arrangement may be generally cuboid shaped (FIG. 2), with the generator-engine-blower arrangement being deployed along a length, L, of the enclosure 102. The enclosure 102 may include a first end 112 and an oppositely positioned second end 126. According to an embodiment of the present disclosure, the blower 108 may be configured to generate suction (or induced draft) and draw an airflow 200 into the enclosure 102 from the first end 112, cause the air to flow over and across the generator 104 and the engine 106, and may further be configured to expel the airflow 200 out of the enclosure 102 from the second end 126.

The enclosure 102 may include a first sidewall 114 and a second sidewall 116 spaced apart opposite from the first sidewall 114. In an embodiment, the first sidewall 114 and the second sidewall 116 may extend parallel to each other and be positioned on either side of a longitudinal axis A-A' of the enclosure 102. The first sidewall 114 and the second sidewall 116 may each have a first end 118, 119 (respectively) proximate to the first end 112 of the enclosure 102, and a second end 120, 121 (respectively) proximate to the second end 126 of the enclosure 102.

The enclosure 102 may further include an inlet end wall 122 coupled to and extending between the first ends 118, 119 of the first sidewall 114 and the second sidewall 116, and parallel to a lateral axis B-B' of the enclosure 102. The inlet end wall 122 along with the first ends 118, 119 of the first sidewall 114 and the second sidewall 116 may define the first end 112 of the enclosure 102.

The enclosure 102 may further include an air outlet 160 including an outlet end wall 124, opposite to the inlet end wall 122. The air outlet 160 may also include a first outlet sidewall 128 and a second outlet sidewall 130. The first outlet sidewall 128 and the second outlet sidewall 130 may be coupled to the outlet end wall 124, and may define a U-shaped structure at the second end 126 of the enclosure 102. The first outlet sidewall 128 and the second outlet sidewall 130 may extend perpendicularly from the outlet end wall 124 in the same direction. In such an embodiment, the first outlet sidewall 128 and the second outlet sidewall 130 may be spaced apart from each other, and may be coupled with the second ends 120, 121, respectively. The outlet end wall 124 along with the first outlet sidewall 128, the second outlet sidewall 130, and the second ends 120, 121 of the first sidewall 114 and the second sidewall 116 may define the second end 126 of the enclosure 102. Further, each of the first sidewall 114, the second sidewall 116, the inlet end wall 122, and the outlet end wall 124, may also extend along a vertical axis C-C' of the enclosure 102 to define a height, H, of the enclosure 102.

The enclosure 102 may further include a top wall 132 having an inlet end edge 182 attached to a top end 158 of the inlet end wall 122, a first lateral edge 184 attached to the first sidewall 114, and a second lateral edge 186 attached to the second sidewall 116. The top wall 132 may further include an outlet end edge 188. In a first embodiment, the outlet end edge 188 may be attached to a top end 174 (shown in FIG. 3) of the outlet end wall 124. In another embodiment, the outlet end edge 188 may be spaced apart from the outlet end wall 124. In an embodiment, the top wall 132 may extend parallel to a surface, such as a base foundation 110 of the enclosure 102, on which each of the first sidewall 114, the second sidewall 116, the inlet end wall 122, and the outlet end wall 124 may be positioned in an upright manner, for example. In an embodiment, the top wall 132 may be perpendicular to each of the first sidewall 114, the second sidewall 116, the inlet end wall 122, and the outlet end wall 124. In an embodiment, the top wall 132 may extend parallel to a plane 136 defined by the longitudinal axis A-A' and the lateral axis B-B'. Further, the top wall 132 along with the first sidewall 114, the second sidewall 116, the inlet end wall 122, and the outlet end wall 124 may define an interior space 134 (as shown in FIG. 3) within the enclosure 102 to house the generator set 100.

The longitudinal axis A-A' extends along the length, L, of the enclosure 102; the lateral axis B-B' extends along a width, W, of the enclosure 102, the lateral axis B-B' being perpendicular to the longitudinal axis A-A'; and the vertical axis C-C' extends along the height, H, of the enclosure 102. As may be visualized from a plan view of the enclosure 102, the enclosure 102 may be symmetrical about a plane 138 defined by the longitudinal axis A-A' and the vertical axis C-C' (i.e. the first sidewall 114 may be symmetrically positioned relative to the second sidewall 116 about the plane 138).

Figure 3:
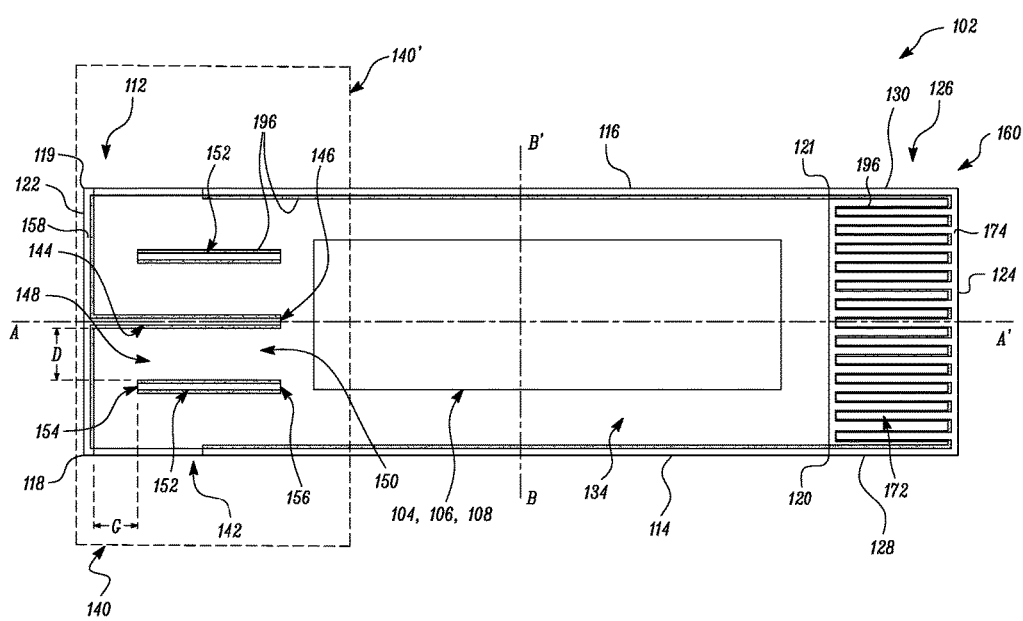
FIG. 3 is a top view of the enclosure without a top wall of the enclosure, in accordance with an exemplary embodiment of the present disclosure.
Figure 4:
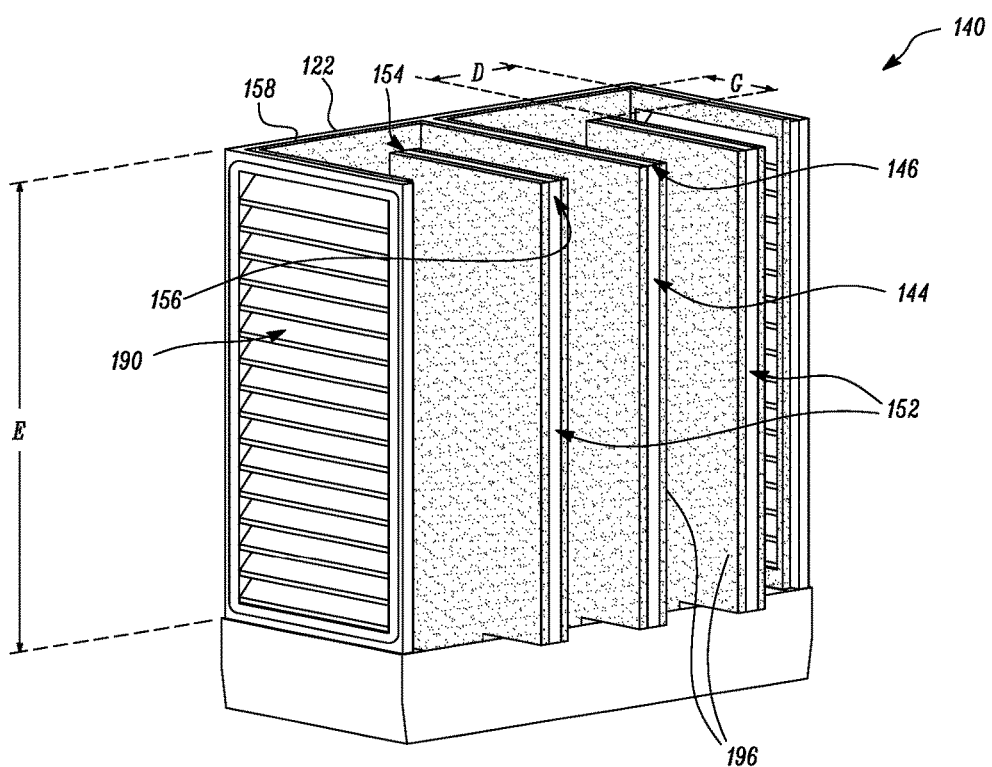
FIG. 4 is a perspective view of an air inlet of the enclosure, in accordance with an exemplary embodiment of the present disclosure.
Figure 5:
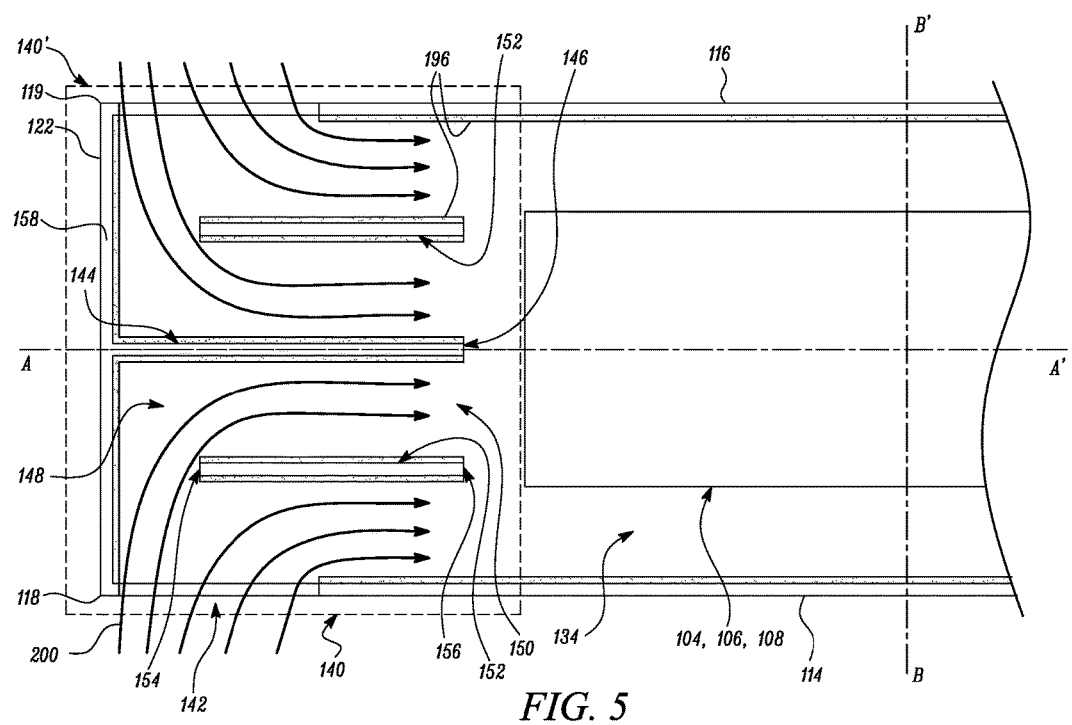
FIG. 5 is a top view of the air inlet of the enclosure, depicting an exemplary profile of an airflow entering the air inlet of the enclosure, in accordance with an embodiment of the present disclosure.

Referring to FIGS. 3, 4, and 5, the enclosure 102 may include an air inlet 140 that may define a passageway for the airflow 200 to enter the interior space 134 of the enclosure 102. The air inlet 140 may be formed at the first end 112 of the enclosure 102, and may be formed by the inlet end wall 122 and the first sidewall 114, in one example. Further, the enclosure 102 may include an air inlet 140', similar to air inlet 140, that may be formed by the inlet end wall 122 and the second sidewall 116, in symmetry to the air inlet 140 about the plane 138, as shown in FIG. 3. However, a description of only the air inlet 140 is provided for clarity and ease. A description of the air inlet 140 may be equivalently applied to the air inlet 140'. Wherever required the air inlet 140' will also be used by specific reference.

The air inlet 140 may include an air inlet opening 142 formed in the first sidewall 114 at the first end 118. The air inlet opening 142 may be parallel to the longitudinal axis A-A' and the vertical axis C-C', and thus to the plane 138. In an embodiment, the air inlet opening 142 may be a rectangular shaped aperture formed in the first sidewall 114, which may provide an entry for the airflow 200 to enter the interior space 134 of the enclosure 102. The rectangular shape of the air inlet opening 142 may be longer along the vertical axis C-C' of the enclosure 102 than along the longitudinal axis A-A' of the enclosure 102. In an embodiment, the air inlet opening 142 may extend substantially entirely along an elevation, E, of the enclosure 102 (as shown in FIG. 4) from the base foundation 110 to the top wall 132.

The air inlet 140 may further include a portion of the inlet end wall 122 and an inlet duct wall 144. The inlet duct wall 144 may extend from the inlet end wall 122 into the interior space 134. The inlet duct wall 144 may extend along the longitudinal axis A-A' of the enclosure 102. Alternatively, the inlet duct wall 144 may extend parallel to the longitudinal axis A-A'. The inlet duct wall 144 may extend parallel to or positioned within the plane 138, and may be perpendicular to the inlet end wall 122. The inlet duct wall 144 may have a free end 146 opposite to the inlet end wall 122. In an embodiment, the inlet duct wall 144 may extend from the inlet end wall 122, such that the inlet duct wall 144 may equally divide the space defined between the first sidewall 114 and the second sidewall 116.

The inlet end wall 122 and the inlet duct wall 144 may form an air inlet duct 148 having an 'L-shaped' profile when viewed from above, such as FIG. 3. The air inlet duct 148 may be in fluid communication with the air inlet opening 142, and may define a passageway for the airflow 200 to enter the interior space 134 of the enclosure 102. The air inlet duct 148 defines an inlet plenum 150 in which the airflow 200 entering through the air inlet opening 142 may be received and directed to the interior space 134.

The air inlet 140 may further include an inlet baffle 152 disposed in the inlet plenum 150 between the inlet duct wall 144 and the first sidewall 114. In an embodiment, the inlet baffle 152 may be a planar wall that divides the inlet plenum 150 between the inlet duct wall 144 and the first sidewall 114. The inlet baffle 152 may be positioned equidistant from the inlet duct wall 144 and the first sidewall 114 and may extend from the top wall 132 to the base foundation 110. Alternatively, the inlet baffle 152 may be spaced apart from one or both of the top wall 132 and the base foundation 110. Further, the inlet baffle 152 may be oriented generally vertically, parallel to the plane 138. In an embodiment, additional baffles may be positioned in the inlet plenum 150, parallel to the inlet baffle 152.

The inlet baffle 152 may be spaced apart from the inlet duct wall 144 by a distance 'D' (as shown in FIG. 3). Further, the inlet baffle 152 may include a first baffle end 154 and a second baffle end 156. The second baffle end 156 may be disposed distant from the inlet end wall 122 relative to the first baffle end 154. A gap 'G' (as shown in FIG. 3) may exist between the inlet baffle 152 and the inlet end wall 122. The distance 'D' and the gap 'G' may direct the airflow 200 into the enclosure 102.

In an embodiment, the air inlet 140 may include louvers 190 disposed at the air inlet opening 142. The louvers 190 may be a set of angled slats fixed at a regular interval in a door which may allow the airflow 200 to enter the interior space 134 of the enclosure 102, and may prevent rain, and the like, to enter the enclosure 102.

Figure 6:
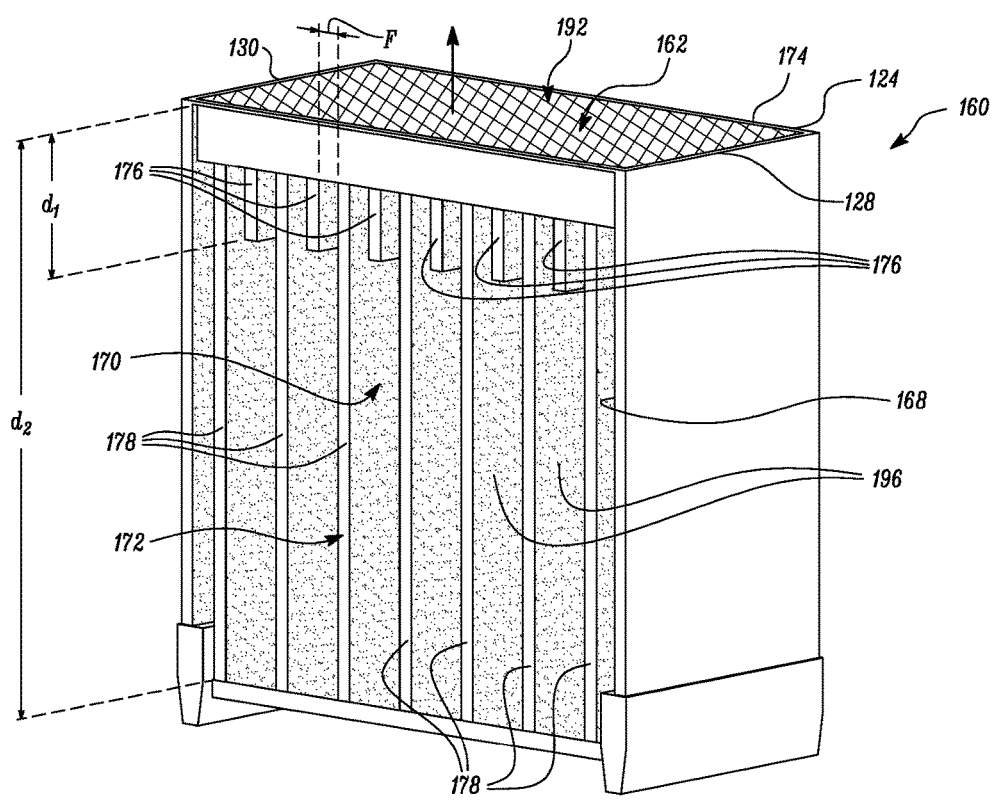
FIG. 6 is a perspective view of an air outlet of the enclosure, in accordance with an embodiment of the present disclosure.
Figure 7:
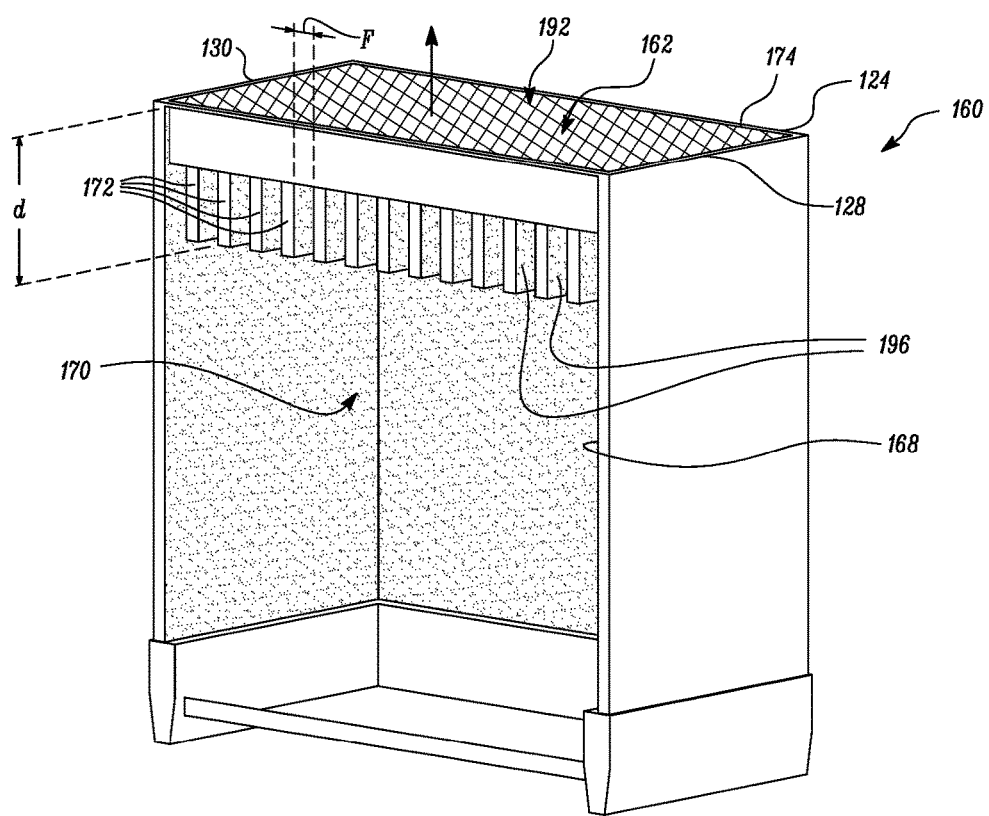
FIG. 7 is a perspective view of another air outlet of the enclosure, in accordance with another embodiment of the present disclosure.

Referring now to FIGS. 3, 6 and 7, the enclosure 102 may include the air outlet 160. The air outlet 160 may be in fluid communication with the air inlet 140, and may provide a passageway for the airflow 200, received from the air inlet 140, 140', to exit the enclosure 102.

The air outlet 160 may include an air outlet opening 162 (as shown in FIG. 6). The air outlet opening 162 may be formed in the top wall 132 of the enclosure 102 proximal to the second end 126 of the enclosure 102. The air outlet opening 162 may be inclined at an angle to the plane 136 defined by the longitudinal axis A-A' and the lateral axis B-B' of the enclosure 102. In an embodiment, the air outlet opening 162 may be parallel to the plane 136 defined by the longitudinal axis A-A' and the lateral axis B-B' of the enclosure 102. In an embodiment, the air outlet opening 162 may be a rectangular shaped aperture formed in the top wall 132, which may provide an exit for the airflow 200 to leave the enclosure 102. The rectangular shape of the air outlet opening 162 may be longer along the lateral axis B-B' of the enclosure 102 than the longitudinal axis A-A' of the enclosure 102. In one example, the rectangular shape of the air outlet opening 162 may be formed by the outlet end edge 188 of the top wall 132 and the outlet sidewalls 128, 130.

The air outlet 160 may include an air outlet duct 168 (as shown in FIGS. 6 and 7). The air outlet duct 168 may be defined by the air outlet opening 162 and the outlet end wall 124. The air outlet 160 may define an outlet plenum 170 (as shown in FIGS. 6 and 7). The outlet plenum 170 may be formed by the outlet end wall 124, the first outlet sidewall 128, and the second outlet sidewall 130. The outlet plenum 170 may be a volume of the interior space 134 in which the airflow 200 from the air inlet 140 may be received after the airflow 200 flows across the generator-engine-blower arrangement of the generator set 100.

The air outlet 160 may further include one or more outlet baffle plates 172 extending from the outlet end wall 124 towards the interior space 134 of the enclosure 102. The one or more outlet baffle plates 172 may extend parallel to the longitudinal axis A-A'. In one embodiment, the one or more outlet baffle plates 172 may extend from the top end 174 towards the base foundation 110 of the enclosure 102. The one or more outlet baffle plates 172 may extend from the top end 174 up to a distance before the base foundation 110, such as up to midway between the top end 174 and the base foundation 110. Further, the outlet baffle plates 172 may be positioned in an array between the first outlet sidewall 128 and the second outlet sidewall 130 spaced apart by a distance 'F'. In an embodiment, the distance 'F' between consecutive outlet baffle plates 172 may be same throughout the distance between the first outlet sidewall 128 and the second outlet sidewall 130 (i.e. the one or more outlet baffle plates 172 are arranged in an array of equidistantly positioned outlet baffle plates), while in alternate embodiment, the distance 'F' between consecutive outlet baffle plates 172 may be different.

In one exemplary embodiment as shown in FIG. 6, the one or more outlet baffle plates 172 may include a first plurality of first outlet baffle plates 176 extending from the top end 174 of the outlet end wall 124. The first outlet baffle plates 176 may have a first dimension, for example a first length, d1, from the top end 174. The one or more outlet baffle plates 172 may further include a second plurality of second outlet baffle plates 178 extending from the top end 174 of the outlet end wall 124. The second outlet baffle plates 178 may have a second dimension, for example a second length, d2, different from the first length, from the top end 174. Each of the first outlet baffle plates 176 may be arranged in between two consecutive second outlet baffle plates 178. Further, in an embodiment, the first length d1 of the first outlet baffle plates 176 may be less than the second length d2 of the second outlet baffle plates 178 (i.e. d1<d2).

Also, in another exemplary embodiment as shown in FIG. 7, each of the outlet baffle plates 172 may have an equal length, d. In some embodiments, lengths of the outlet baffle plates 172 may successively increase in a direction defined from the first outlet sidewall 128 to the second outlet sidewall 130. In some cases, conversely, the lengths of the outlet baffle plates 172 may successively decrease in the same direction. In additional embodiments, the lengths of the outlet baffle plates 172 may first successively decrease from the first outlet sidewall 128 and may then successively increase towards the second outlet sidewall 130. Further, the lengths of the outlet baffle plates 172 may successively increase from the first outlet sidewall 128 and then may successively decrease towards the second outlet sidewall 130.

The outlet baffle plates 172 may be arranged equidistantly from the first outlet sidewall 128 and the second outlet sidewall 130, but in some alternate embodiments, the outlet baffle plates 172 may be separated respectively from the first outlet sidewall 128 and the second outlet sidewall 130 by unequal distances. Further, a number of the first outlet baffle plates 176 and the second outlet baffle plates 178 may be varied according to a design of the enclosure 102.

In an embodiment, the air outlet 160 may include a cover 192 mounted on the air outlet opening 162. The cover 192 may be a perforated shield or screen which may allow the airflow 200 to escape the interior space 134 of the enclosure 102, and may prevent any foreign object, such as dirt, debris, and the like, to enter the enclosure 102. The cover 192 may include, but not limited to, a mesh or a grate, and the like.

Furthermore, the enclosure 102 may include a sound absorbing layer 196 disposed upon one or more surfaces of the air inlet 140, the first sidewall 114, the second sidewall 116, the top wall 132, and the air outlet 160. More specifically, the sound absorbing layer 196 may be disposed upon the first sidewall 114, the second sidewall 116, the top wall 132, the inlet end wall 122, the inlet duct wall 144, the inlet baffle 152, the outlet end wall 124, and the outlet baffle plates 172, and each of said sound absorbing layer 196 may face the interior space 134 of the enclosure 102. The sound absorbing layer 196 may provide sound attenuation within the enclosure 102. The sound absorbing layer 196 may be selected from fiberglass, mineral wool, woven and non-woven fabrics, polymers (including foams), rubber, and other suitable materials known in the art.

In an embodiment, a thickness of the sound absorbing layer 196 may be varied on the inlet baffle 152 to alter the sound attenuation. Also, a material of the sound absorbing layer 196 may be varied to alter acoustic performance and durability, such as resistance to water, fluids, dust, debris, and the like.

INDUSTRIAL APPLICABILITY

During operation, the blower 108 may induce air to be drawn into the interior space 134 of the enclosure 102 as airflow 200 through the air inlets 140, 140'. The airflow 200 may be first received into the inlet plenum 150 of the interior space 134 of the enclosure 102 through the air inlet opening 142 of the enclosure 102. The airflow 200 may then be directed in a lateral direction towards the inlet duct wall 144, and may impinge on the inlet duct wall 144 of the air inlet 140, which directs the airflow 200 in a longitudinal direction into the interior space 134 following a profile (i.e. the L-shaped profile) of the air inlet duct 148. Thereafter, the airflow 200 may encounter the inlet baffle 152 disposed in the inlet plenum 150. The inlet baffle 152 may split the airflow 200 into two airstreams. The inlet baffle 152 may guide the two airstreams towards the second end 126 of the enclosure 102. Therefore, the airflow 200 may enter the middle, sides, top, or bottom of the components of the generator set 100 to find the path of lowest restriction.

While flowing towards the second end 126 of the enclosure 102, the airflow 200 may flow over and across the various components of the generator set 100. During this, the airflow 200 may contact outer surfaces of the various components of the generator set 100, and transfer heat and noise generated by the various components of the generator set 100. The airflow 200 may then be directed to the outlet plenum 170.

The airflow 200 received in the outlet plenum 170 may proceed further and impinge on the outlet end wall 124, and, as a result, be directed towards the air outlet opening 162. As the airflow 200 may flow towards the air outlet opening 162, the outlet baffle plates 172 may split the airflow 200 into multiple airstreams before expelling the airflow 200 through the air outlet opening 162. The outlet end wall 124 along with the outlet baffle plates 172 may direct the airflow 200 upwards of the generator set 100 to prevent hot airflow 200 to be directed on any bystanders/operators/technicians/supervisors stationed in the vicinity of the enclosure 102. The upward discharge of the airflow 200 may also cause a sound (generated by the generator set 100) to be released upwards (i.e., along the vertical direction), thereby improving a sound quality of the generator set 100. The second outlet baffle plates 178 (as shown in FIG. 6) may increase sound attenuation, and may offer least restriction flow path to the airflow 200. Also, the first outlet baffle plates 176 (as shown in FIG. 6) may facilitate additional sound attenuation at the air outlet opening 162.

As the airflow 200 may flow through the interior space 134 of the enclosure 102, the airflow 200 may also contact the sound absorbing layer 196 that may absorb at least a part of the noise generated by the various components and systems of the generator set 100, and may reduce interior sound reflections that may reach the openings 142, 162, thereby attenuating an overall external noise generated by the generator set 100.

It can thus be contemplated from the disclosure above, that the enclosure 102 may receive the airflow 200 from the lateral direction, and may discharge the airflow 200. This discharge of the airflow 200 mitigates ambient heat and noise in the vicinity of the first sidewall 114, the second sidewall 116, the inlet end wall 122, and the outlet end wall 124 of the enclosure 102.

It can be contemplated that the air inlet opening 142 formed in the first and second sidewalls 114, 116 may provide a greater inlet area to the airflow 200 as compared to an end opening (not shown) which may have formed in the inlet end wall 122. This greater inlet area may offer lower restriction especially through weather proof/rain-resistant inlet grilles.

Further, in an embodiment, a directional change in the airflow 200 may be done with high area/low velocity to enable lower flow restriction to the airflow 200. Also, the inlet baffle 152 may decrease the uneven airflow and duct loses, and may block line-of-sight into the enclosure 102.

In an embodiment, the air inlet 140 (and the air inlet 140') has been described to be formed of various different components, such as, the inlet end wall 122, the air inlet opening 142, the inlet duct wall 144, and the inlet baffle 152. However, in an alternate embodiment, the air inlet 140 (and the air inlet 140') may be formed as a modular unit which may be retro-fitted at the first ends 118, 119 of the first sidewall 114 and the second sidewall 116, respectively. Similarly, the air outlet 160 has been described to be formed of the outlet end wall 124, the air outlet opening 162, and the outlet baffle plates 172, however, the air outlet 160 may be formed as a modular unit, as well, which may be retro-fitted at the second ends 120, 121 of the first sidewall 114 and the second sidewall 116, respectively.

In an exemplary embodiment, the length L' of the first sidewall 114 and the second sidewall 116, in the longitudinal direction of the enclosure 102 may be dimensioned 7112 mm (i.e. a length L' of the enclosure 102 may equal to 7112 mm). Further, the width W' of the enclosure 102 in the lateral direction may be dimensioned to 2052 mm (i.e. the inlet end wall 122 and the outlet end wall 124 may equal to 2052 mm). Furthermore, the height 'H' of the enclosure 102 in a vertical direction may be dimensioned to 2999 mm (i.e. elevation of the first sidewall 114, the second sidewall 116, the inlet end wall 122, and the outlet end wall 124 may equal to 2999 mm). In such an embodiment, a volume of the interior space 134 may be sized to 7112 mm by 2052 mm by 2999 mm.

In another embodiment, the blower 108 may be positioned between the generator set 100 and the air outlet 160. More specifically, the blower 108 may be positioned 1.5 m from the outlet end wall 124 of the air outlet 160. However, in various alternate embodiments, the blower 108 may be positioned at any suitable position, such as between air inlet 140 and the generator set 100, in the interior space 134 of the enclosure 102.

In an embodiment of the air inlet 140, the inlet duct wall 144 may extend up to 1.7 m from the inlet end wall 122 towards the interior space 134 of the enclosure 102. Further, the first baffle end 154 may be at 0.45 m from the inlet end wall 122 towards the interior space 134, and the second baffle end 156 may be at 0.90 m from the inlet end wall 122 towards the interior space 134 (i.e. the gap 'G' may equal to 0.45 m from the inlet end wall 122 towards the interior space 134).

In an embodiment of the air outlet 160, the one or more outlet baffle plates 172 may be at 0.35 m from each other between the first outlet sidewall 128 and the second outlet sidewall 130, such that the one or more outlet baffle plates 172 adjacent to the respective outlet sidewalls (128, 130) may be at 0.3 m from the respective outlet sidewalls (128, 130). Further, the first length 'd1' of the first outlet baffle plates 176 may equal to 0.9 m, and the second length 'd2' of the second outlet baffle plates 178 may equal to 1.8 m.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof

What is claimed is:

1. An enclosure defining an interior space for a generator set including an engine coupled to an electrical generator, the enclosure comprising:
    an air inlet including
        an air inlet opening formed in a sidewall of the enclosure and disposed proximal to a first end of the enclosure, the air inlet opening being parallel to a center longitudinal axis of the enclosure, and
        an air inlet duct in fluid communication with the air inlet opening, the air inlet duct including
            an inlet end wall disposed at the first end and positioned parallel to a center lateral axis of the enclosure, the center lateral axis being perpendicular to the center longitudinal axis, and
            an inlet duct wall extending from the inlet end wall, the inlet duct wall having a length, the length of the inlet duct wall being located on the center longitudinal axis; and
    an air outlet disposed at a second end of the enclosure and in fluid communication with the air inlet, the air outlet including
        an air outlet duct including
            an outlet end wall disposed at the second end of the enclosure and being parallel to the center lateral axis, and
            an air outlet opening formed in a top wall of the enclosure and disposed proximal to the second end of the enclosure, the air outlet opening being parallel to a plane defined by the center longitudinal axis and the center lateral axis, and
            one or more outlet baffle plates extending from the outlet end wall into the interior space, the one or more outlet baffle plates being parallel to the center longitudinal axis and extending from a top end of the outlet end wall,
    wherein the air inlet duct defines an inlet plenum, the inlet plenum including at least one inlet baffle,
    wherein the at least one inlet baffle is positioned spaced apart from the inlet duct wall and parallel to the inlet duct wall,
    wherein the at least one inlet baffle is positioned spaced apart from the inlet end wall and perpendicular to the inlet end wall,
    wherein respective portions of the inlet duct wall, the at least one inlet baffle, and the air inlet opening overlap in a side view of the enclosure, and
    wherein the inlet plenum defined by the air inlet duct forms two air pathways, a first air pathway defined by the inlet end wall, the inlet duct wall, and a first side of the at least one inlet baffle, and a second air pathway defined by the sidewall of the enclosure and a second side of the at least one inlet baffle opposite the first side.

2. The enclosure of claim 1, wherein the one or more outlet baffle plates are arranged in an array of equidistantly positioned outlet baffle plates, each equidistantly positioned outlet baffle plate being equal in dimension to the other outlet baffle plates.

3. The enclosure of claim 1,
    wherein the one or more outlet baffle plates include a plurality of first outlet baffle plates and a plurality of second outlet baffle plates, each of the plurality of first outlet baffle plates having a first dimension and each of the plurality of second outlet baffle plates having a second dimension, the first dimension being different from the second dimension, and
    wherein each of the first outlet baffle plates is arranged in between two consecutive second outlet baffle plates.

4. The enclosure of claim 3, wherein the first dimension of the plurality of first outlet baffle plates is less than the second dimension of the plurality of second outlet baffle plates.

5. The enclosure of claim 1 further comprising a sound absorbing layer disposed upon one or more of the outlet baffle plates, the at least one inlet baffle, the inlet end wall, the inlet duct wall, the outlet end wall, and a first outlet sidewall and a second outlet sidewall of the air outlet duct.

6. The enclosure of claim 1, wherein the air inlet duct is configured to receive air from the air inlet opening and direct the received air against the inlet end wall, the inlet duct wall, and the first and second sides of the at least one inlet baffle.

7. The enclosure of claim 1, wherein the length of the inlet duct wall, which is located on the center longitudinal axis, is greater than a width of the inlet duct wall.

8. The enclosure of claim 1, wherein a first distance from the inlet end wall to a first end of the at least one inlet baffle is 0.45 m, a length of the air inlet opening is 0.9 m, and a second distance from the inlet end wall to a second end of the at least one inlet baffle is 1.7 m.

9. The enclosure of claim 1, wherein the at least one inlet baffle extends from the top wall of the enclosure to a base foundation of the enclosure.

10. A generator set comprising:
an enclosure defining an interior space for the generator set including an engine coupled to an electrical generator, the enclosure defining a center longitudinal axis, and a center lateral axis, the center lateral axis being perpendicular to the center longitudinal axis, the enclosure having a first end and a second end, the enclosure including
an air inlet including
an air inlet opening formed in a sidewall of the enclosure and disposed proximal to the first end, the air inlet opening being parallel to the center longitudinal axis, and
an air inlet duct in fluid communication with the air inlet opening, the air inlet duct including
an inlet end wall disposed at the first end and positioned parallel to the center lateral axis, and
an inlet duct wall extending from the inlet end wall, the inlet duct wall having a length, the length of the inlet duct wall being located on the center longitudinal axis; and
an air outlet disposed at the second end and in fluid communication with the air inlet, the air outlet including
an air outlet duct including
an outlet end wall disposed at the second end of the enclosure and being parallel to the center lateral axis, and
an air outlet opening formed in a top wall of the enclosure and disposed proximal to the second end of the enclosure, the air outlet opening being parallel to a plane defined by the center longitudinal axis and the center lateral axis, and
one or more outlet baffle plates extending from the outlet end wall into the interior space, the one or more outlet baffle plates being parallel to the center longitudinal axis and extending from a top end of the outlet end wall,
wherein the air inlet duct defines an inlet plenum, the inlet plenum including at least one inlet baffle,
wherein the at least one inlet baffle is positioned spaced apart from the inlet duct wall and parallel to the inlet duct wall,
wherein the at least one inlet baffle is positioned spaced apart from the inlet end wall and perpendicular to the inlet end wall,
wherein respective portions of the inlet duct wall, the at least one inlet baffle, and the air inlet opening overlap in a side view of the enclosure, and
wherein the inlet plenum defined by the air inlet duct forms two air pathways, a first air pathway defined by the inlet end wall, the inlet duct wall, and a first side of the at least one inlet baffle, and a second air pathway defined by the sidewall of the enclosure and a second side of the at least one inlet baffle opposite the first side.

11. The generator set of claim 10, wherein the one or more outlet baffle plates are arranged in an array of equidistantly positioned outlet baffle plates, each equidistantly positioned outlet baffle plate being equal in dimension to the other outlet baffle plates.

12. The generator set of claim 10,
wherein the one or more outlet baffle plates include a plurality of first outlet baffle plates and a plurality of second outlet baffle plates, each of the plurality of first outlet baffle plates having a first dimension and each of the plurality of second outlet baffle plates having a second dimension, the first dimension being different from the second dimension, and
wherein each of the first outlet baffle plates is arranged in between two consecutive second outlet baffle plates.

13. The generator set of claim 12, wherein the first dimension of the plurality of first outlet baffle plates is less than the second dimension of the plurality of second outlet baffle plates.

14. The generator set of claim 8 further comprising a sound absorbing layer disposed upon one or more of: the outlet baffle plates, the at least one inlet baffle, the inlet end wall, the inlet duct wall, the outlet end wall, a first outlet sidewall of the air outlet duct, and a second outlet sidewall of the air outlet duct.

15. The generator set of claim 10 further comprising a blower positioned within the interior space adjacent the air outlet, the blower configured to provide an airflow through the interior space of the enclosure.

16. The generator set of claim 15, wherein the blower includes an upstream side and a downstream side, wherein the airflow enters the interior space from the air inlet opening on the upstream side and the airflow leaves the interior space from the air outlet opening on the downstream side.

17. The generator set of claim 10, wherein the engine and the electrical generator are located between the air inlet and the air outlet.

* * * * *